(12) United States Patent
Hummel et al.

(10) Patent No.: US 11,390,362 B2
(45) Date of Patent: Jul. 19, 2022

(54) FLOATING WIND POWER PLATFORM

(71) Applicant: FREIA OFFSHORE AB, Stockholm (SE)

(72) Inventors: Niklas Hummel, Saltsjöbaden (SE); Magnus Rahm, Uppsala (SE); Eduard Dyachyk, Enskededalen (SE)

(73) Assignee: FREIA OFFSHORE AB, Stockholm (SE)

( * ) Notice: Subject to any disclaimer, the term of this patent is extended or adjusted under 35 U.S.C. 154(b) by 127 days.

(21) Appl. No.: 16/962,099

(22) PCT Filed: Jan. 16, 2019

(86) PCT No.: PCT/SE2019/050027
§ 371 (c)(1),
(2) Date: Jul. 14, 2020

(87) PCT Pub. No.: WO2019/143282
PCT Pub. Date: Jul. 25, 2019

(65) Prior Publication Data
US 2020/0339230 A1 Oct. 29, 2020

(30) Foreign Application Priority Data
Jan. 19, 2018 (SE) .................................. 1850064-5

(51) Int. Cl.
*B63B 35/44* (2006.01)
*F03D 13/25* (2016.01)
(Continued)

(52) U.S. Cl.
CPC .............. *B63B 35/44* (2013.01); *B63B 1/107* (2013.01); *B63B 21/502* (2013.01);
(Continued)

(58) Field of Classification Search
CPC .............. B63B 35/44; B63B 2001/128; B63B 2035/446; B63B 2241/08; F03D 13/25
See application file for complete search history.

(56) References Cited

U.S. PATENT DOCUMENTS

| 8,471,396 B2 * | 6/2013 | Roddier | F03D 13/10 290/44 |
| 10,180,129 B2 * | 1/2019 | Couchman | F03D 7/02 |

(Continued)

FOREIGN PATENT DOCUMENTS

| WO | 2011137903 A2 † | 11/2011 |
| WO | WO 2015/164386 A1 | 10/2015 |

(Continued)

OTHER PUBLICATIONS

International Search Report, issued in PCT/SE2019/050027, dated Mar. 15, 2019.

(Continued)

*Primary Examiner* — S. Joseph Morano
*Assistant Examiner* — Jovon E Hayes
(74) *Attorney, Agent, or Firm* — Birch, Stewart, Kolasch & Birch, LLP

(57) ABSTRACT

A floating wind power platform for offshore power production includes a floating unit, wherein the floating unit includes a first, a second and a third interconnected semi-submersible column each having a longitudinal column central axis and each being arranged in a respective corner of the floating unit, a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), and directed away from (Continued)

each other, wherein the first and second longitudinal tower central axes are parallel to the first and second longitudinal column central axes, respectively.

16 Claims, 3 Drawing Sheets

(51) Int. Cl.
*B63B 1/10* (2006.01)
*B63B 21/50* (2006.01)
*B63B 1/12* (2006.01)

(52) U.S. Cl.
CPC ............ *B63B 21/507* (2013.01); *F03D 13/25* (2016.05); *B63B 2001/128* (2013.01); *B63B 2035/446* (2013.01); *B63B 2241/08* (2013.01); *F05B 2240/93* (2013.01); *F05B 2240/95* (2013.01); *F05B 2240/96* (2013.01)

(56) References Cited

U.S. PATENT DOCUMENTS

| | | | | |
|---|---|---|---|---|
| 2011/0006539 A1* | 1/2011 | Lefranc | ................ | B63B 21/507 290/55 |
| 2011/0311360 A1* | 12/2011 | Nedrebo | ................ | B63B 35/44 416/85 |
| 2012/0043763 A1* | 2/2012 | De Boer | ................ | F03D 13/10 290/55 |
| 2012/0093648 A1* | 4/2012 | Royseth | ................ | F03B 13/187 416/85 |
| 2020/0339230 A1* | 10/2020 | Hummel | ................ | B63B 35/44 |

FOREIGN PATENT DOCUMENTS

WO        2017206976 A1 † 12/2017
WO    WO 2017/206976 A1    12/2017

OTHER PUBLICATIONS

Written Opinion of the International Searching Authority, issued in PCT/SE2019/050027, dated Mar. 15, 2019.
Ch. 12 from a book titled Aquaculture Perspective of Multi-Use Sites in the Open Ocean. The Untapped Potential for Marine Resources in the Anthropocene, published 2017 by Springer International Publishing AG with ISBN 978-3-319-51157-3 (print), ISBN 978-3-319-51159-7 (eBook), DOI10.1007/978-3-319-51159-7 and Library of Congress Control No. 2016960276.†
Public project report published in Jan. 2015 named Marinet Marine Renewable Infrastructure network. Submitted with a screenshot of the full document as shown in the Internet Archive Wayback Machine archived on Sep. 29, 2016 (retrieved Jun. 9, 2021, available at https://web.archive.org/web/20160929054832/http://www.marinet.eu/public/docs/W2P%20performance%20test.pdf).†
D4.4 Third Party Validation Report for 3 reference TROPOS Systems. Bureau Veritas. 48 pages. Jan. 30, 2015.†

\* cited by examiner
† cited by third party

FLOATING WIND POWER PLATFORM

TECHNICAL FIELD

The present invention relates generally to floating wind power platform.

BACKGROUND ART

It is known to use tilted rotor supporting towers arranged in floating wind power units wherein the towers are inclined with respect to each other and the floating unit to which they are attached.

A drawback with known solutions is that the floating units are material as well as space consuming, whereby both manufacturing and transport is expensive. A further drawback is that the interface in the attachment between the towers and the floating unit are angled whereby specially made, customized and non-standard towers have to be used. As a result, the manufacturing cost further increases.

SUMMARY OF INVENTION

An object of the present invention is to alleviate some of the disadvantages of the prior art and to provide a floating wind power platform which requires less material during manufacturing, is cheaper to manufacture and is less space consuming and more compact. A further object of the present invention is to provide a floating wind power platform with tilted towers which employs standard type wind towers.

According to one embodiment of the invention, a floating wind power platform for offshore power production is provided, comprising,
a floating unit, wherein the floating unit comprises a first, a second and a third interconnected semisubmersible column each having a longitudinal column central axis and each being arranged in a respective corner of the floating unit,
a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), and directed away from each other, wherein the first and second longitudinal tower central axes are parallel to the first and second longitudinal column central axes, respectively.

According to one embodiment, the first and second angles ($\alpha_1$, $\alpha_2$) are the same.

According to one embodiment, the first and second angles are in the interval of $5°\leq(\alpha_1, \alpha_2)\leq25°$, more preferably $10°\leq(\alpha_1, \alpha_2)\leq20°$, most preferably $12°\leq(\alpha_1, \alpha_2)\leq17°$.

According to one embodiment, the first and second angles ($\alpha_1$, $\alpha_2$) are 15°.

According to one embodiment, the floating unit is shaped as a triangle wherein the corners of the triangle form the corners of the floating unit.

According to one embodiment, the floating unit comprises a truss structure.

According to one embodiment, the semisubmersible columns are interconnected to each other via upper connection members and parallelly arranged corresponding lower connection members, wherein the lower connection members are shorter than the upper connection members.

According to one embodiment, the first and second towers are interconnected to the first and second semisubmersible column, respectively.

According to one embodiment, abutment surfaces, forming interfaces between the first and second towers and the first and second semisubmersible columns, respectively, have a normal direction parallel to the first and second longitudinal tower central axes and the first and second longitudinal column central axes, respectively.

According to one embodiment, the first and second towers are integral with and forms the first and second semisubmersible columns.

According to one embodiment, the diameter and cross-sectional area of the first and second towers and the first and second semisubmersible columns, respectively, are similar.

According to one embodiment, the first and second semisubmersible columns span a plane, wherein the plane has a normal direction in a horizontal direction.

According to one embodiment, the first and second longitudinal tower central axes are aligned with the first and second longitudinal column central axes, respectively.

According to one embodiment, first and second supporting members are arranged to interconnect the first and second towers with the floating unit respectively.

According to one embodiment, the floating wind power platform is further adapted to weather vane in relation to the wind direction.

According to one embodiment, the reference direction (z) is a vertical direction (z).

According to one embodiment a floating wind power platform for offshore power production is provided, comprising,
a floating unit, wherein the floating unit comprises a first, a second and a third interconnected semisubmersible column each having a longitudinal column central axis and each being arranged in a respective corner of the floating unit,
a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), and being directed away from each other, wherein the first and second longitudinal tower central axes are parallel to the first and second longitudinal column central axes, respectively.

According to one embodiment a floating wind power platform for offshore power production is provided, comprising,
a floating unit, wherein the floating unit comprises a first, a second and a third interconnected semisubmersible column each having a longitudinal column central axis and each being arranged in a respective corner of the floating unit,
a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), wherein the first and second semisubmersible columns are directed away from each other, wherein the first and second longitudinal tower central axes are parallel to the first and second longitudinal column central axes, respectively.

BRIEF DESCRIPTION OF DRAWINGS

The invention is now described, by way of example, with reference to the accompanying drawings, in which.

DESCRIPTION OF EMBODIMENTS

Figure 1:
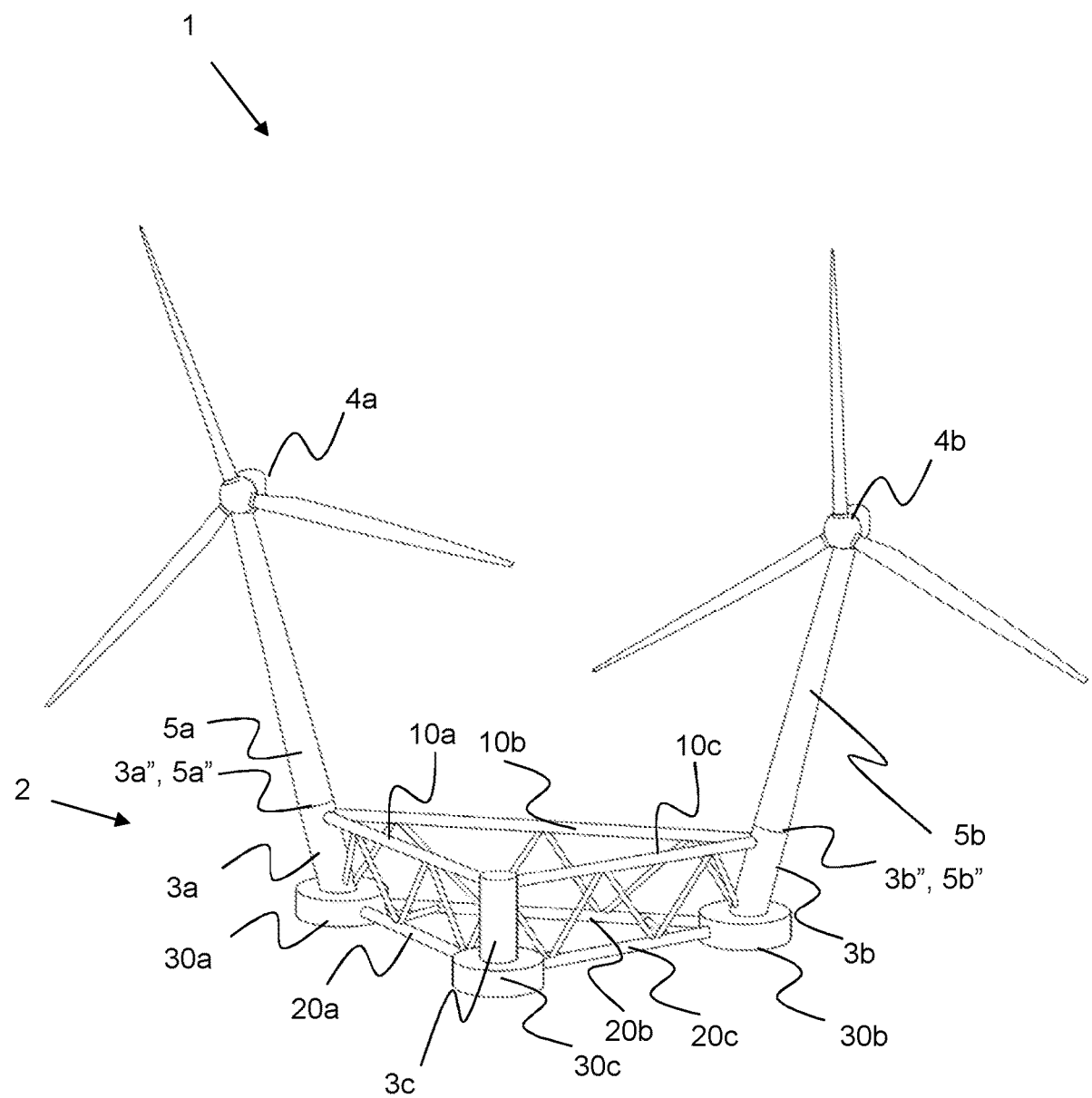
FIG. 1 shows a perspective view of a floating wind power platform for offshore power production.

In the following, a detailed description of the invention will be given. In the drawing figures, like reference numerals designate identical or corresponding elements throughout the several figures. It will be appreciated that these figures are for illustration only and are not in any way restricting the scope of the invention.

FIG. 1 shows a perspective view of a floating wind power platform 1 for offshore power production comprising a floating unit 2. According to one embodiment, the floating unit 2 comprises three interconnected semisubmersible columns 3a, 3b, 3c, i.e. a first, a second, and a third semisubmersible column 3a, 3b, 3c, each having a longitudinal column central axis 3a', 3b', 3c' as can be further seen in FIG. 2. According to one embodiment, the floating unit 2 comprises a plurality of semisubmersible columns. According to one embodiment, the floating unit 2 comprises more than three semisubmersible columns. According to one embodiment, the semisubmersible columns are interconnected to each other via at least three connection members 10a, 10b, 10c, 20a, 20b, 20c. In the case of a floating unit 2 comprising more than three semisubmersible columns, the first, second and third semisubmersible columns may be indirectly interconnected to each other. According to one embodiment, the semisubmersible columns are interconnected to each other via upper connection members 10a, 10b, 10c and parallelly arranged corresponding lower connection members 20a, 20b, 20c. According to one embodiment, the lower connection members 20a, 20b, 20c are shorter than the upper connection members 10a, 10b, 10c. As a result, the total use of material in the floating unit 2 may be reduced as compared to a floating unit 2 of upper and lower connection members of similar length. According to one embodiment, the normal water level during use of the floating wind power platform 1 is half the distance between the upper connection members 10a, 10b, 10c, and the lower connection members 20a, 20b, 20c, respectively. According to one embodiment, the semisubmersible columns are each being arranged in a respective corner of the floating unit 2. According to one embodiment, the semisubmersible columns are buoyant structures. According to one embodiment, the semisubmersible columns extend to and has an upper and at least above the upper connection members 10a, 10b, 10c. According to one embodiment, the semisubmersible columns 3a, 3b, 3c have a respective base end portion 30a, 30b, 30c of increased diameter which increases the buoyancy and the displacement of the semisubmersible columns 3a, 3b, 3c as well as their respective areas and thus resistance to move in the water. According to one embodiment, the base end portions 30a, 30b, 30c are cylinder shaped comprising a central axis 30a', 30b', 30c' respectively (not shown), wherein each central axis 30a', 30b', 30c' is parallel to a reference direction z. According to one embodiment, the distance between the central axis 30a' and central axis 30b' is approximately 100 m, also referred to as the length of the platform. According to one embodiment, the distance between the central axis 30c' and either of central axis 30a' or 30b' is approximately 50 m, also referred to as the platform beam. According to one embodiment, the reference direction z is essentially parallel to or parallel to a normal direction of a plane spanned by the end points of the of the longitudinal column central axes 3a', 3b', 3c' on the respective semisubmersible columns 3a, 3b, 3c. According to one embodiment, the reference direction z is essentially parallel to or parallel to a normal direction of a plane spanned by the upper connection members 10a, 10b, 10c, or alternatively, the lower connection members 20a, 20b, 20c, or both. According to one embodiment the reference direction z is essentially parallel to or parallel to a vertical line or a plumb line during normal use of the wind power platform 1. According to one embodiment the reference direction z is a vertical direction z. According to one embodiment, the floating unit 2 is shaped as a triangle wherein the corners of the triangle form the corners of the floating unit 2. According to one embodiment the triangle is an isosceles triangle. According to one embodiment, the connection members 10a, 10c, and/or 20a, 20c have different lengths, respectively thus forming a non-isosceles or non-uniform, i.e. and oblique triangle. According to one embodiment, the floating unit is shaped as a polygon with semisubmersible columns in each corner. According to one embodiment, semisubmersible columns may be arranged centrally in the floating unit 2. According to one embodiment, the floating unit 2 comprises a truss structure. According to one embodiment, the floating unit 2 comprises a framework structure. According to one embodiment, a plurality of connection members are arranged to interconnected upper and lower connection members. According to one embodiment, the floating wind power platform 1 is adapted to weather vane in relation to the wind direction. According to one embodiment, weather vaning is provided by a turret attached to the floating unit 2. According to one embodiment, the turret is further interconnected to a mooring system. According to one embodiment, the turret is attached to one of the semisubmersible columns 3a, 3b, 3c.

According to one embodiment, the floating wind power platform comprises a first and second wind turbine 4a, 4b, arranged to a first and second semisubmersible column 3a, 3b, respectively, via a first and second tower 5a, 5b, respectively. According to one embodiment, if the floating unit 2 comprises more than three semisubmersible columns, further wind turbines may be arranged in the floating unit 2, e.g. on semisubmersible columns. According to one embodiment, if further wind turbines are arranged in the floating unit 2, they may be arranged in a row. According to one embodiment, a turret is attached to a third semisubmersible column 3c. According to one embodiment, the first and second tower 5a, 5b has a first and second longitudinal tower central axis 5a', 5b', respectively as can be further seen in FIG. 2. According to one embodiment, the first and second towers 5a, 5b are interconnected to the first and second semisubmersible column 3a, 3b, respectively. According to one embodiment, if three semisubmersible columns are arranged in a row, the middle semisubmersible column and wind tower may have a longitudinal column central axis and longitudinal tower central axis that are parallel to the reference direction z. According to one embodiment, the diameter and cross-sectional area of the first and second towers 5a, 5b and the first and second semisubmersible columns 3a, 3b respectively, are similar. According to one embodiment, abutment surfaces 3a", 5a" and 3b", 5b" forming interfaces between the first and second towers 5a, 5b and the first and second semisubmersible columns 3a, 3b, respectively, have a normal direction parallel to the first and second longitudinal tower central axes 5a', 5b' and first and second longitudinal column central axes 3a', 3b', respectively. According to one embodiment, the abutment surfaces 3a", 5a" and 3b", 5b" have a circular ring shape. According to one embodiment, the abutment surfaces 3a", 5a" and 3b", 5b" have a circular area shape. Thus, the selection of such normal direction of the abutment surfaces enables the use of circular, circular ring or circular areas as opposed to elliptically shaped abutment surfaces resulting from abutment surfaces of the towers and/or columns having a normal direction being non-parallel to the longitudinal tower central axis and/or longitudinal column central axis. The shaping of elliptical abutment surfaces is difficult to achieve with a sufficient accuracy to enable the necessary fit between two elliptical abutment surfaces required during attachment between the tower 5a, 5b and the semisubmersible column 3a, 3b. This is particularly so since the abutment surfaces are commonly shaped as bolt flanges comprising holes for bolts or bolted connections which need to match during attachment procedure. As a result, standard wind towers 5a, 5b may be used for the floating wind power platform 1 according to the invention and no specially made or designed wind towers have be used which would increase the cost of manufacture. Further, if both tower 5a", 5b" and column abutment surfaces 3b", 5b" have a normal direction parallel to the respective longitudinal tower central axis 5a', 5b' and longitudinal column central axis 3a', 3b', the difficulty of trying to combine and attach a circular, circular ring, or circular area shape to an elliptical, elliptical ring, elliptical area shape respectively is avoided. According to one embodiment, the first and second towers 5a, 5b are integral with and forms the first and second semisubmersible columns 3a, 3b.

Figure 2:
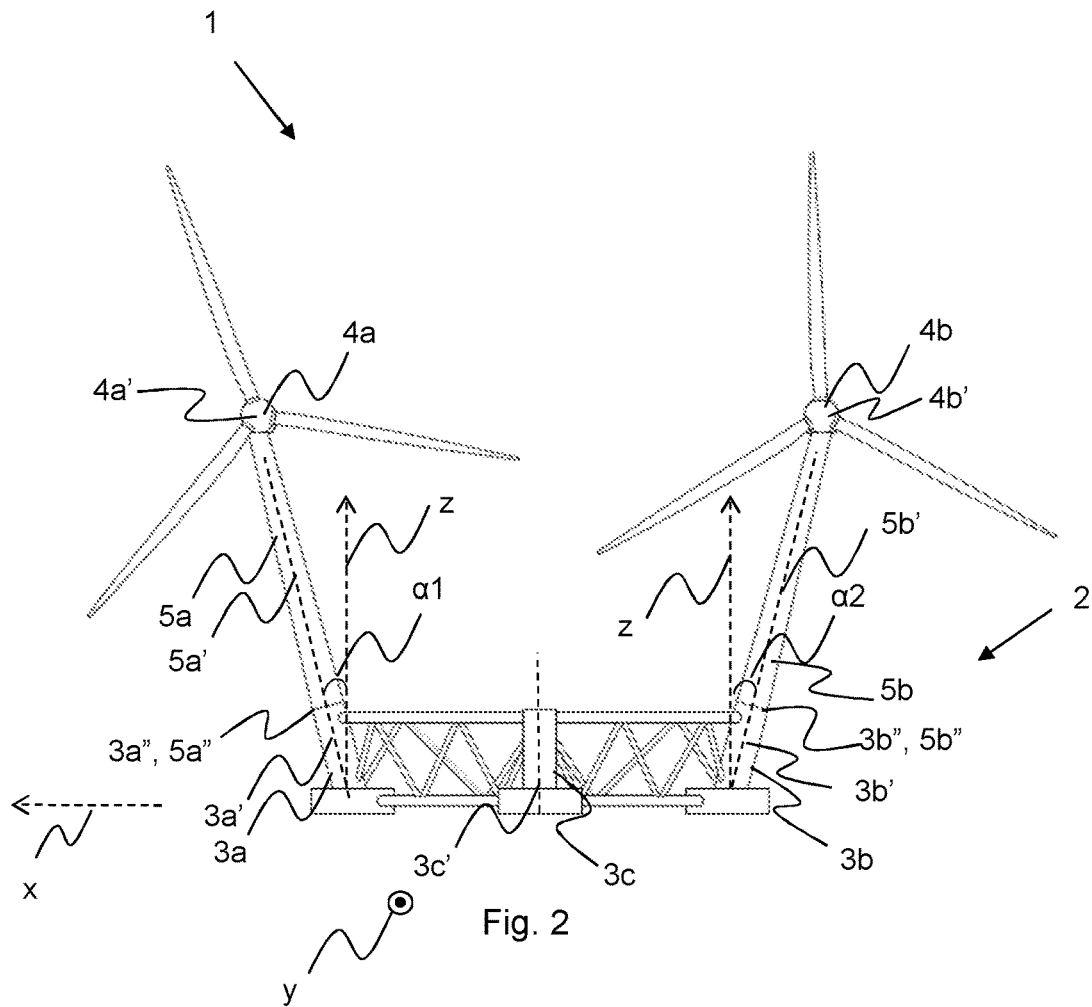
FIG. 2 shows a side view of the floating wind power platform according to FIG. 1.

FIG. 2 shows a side view of the floating wind power platform 1 for offshore power production as seen essentially in a direction parallel to a rotational axis 4a', 4b' of the turbine rotors. According to one embodiment, the first and second semisubmersible columns 3a, 3b are arranged in the floating unit 2 with a first and second angle $\alpha_1$, $\alpha_2$ respectively, with respect to a reference direction z, and directed away from each other. According to one embodiment, being directed away from each other also means that the wind turbines are farther away from each other than other portions of their respective semisubmersible columns 3a, 3b, or at least the lowermost base end portion of the semisubmersible columns 3a, 3b. According to one embodiment, the first and second semisubmersible columns 3a, 3b are directed away from each other with a total angle corresponding to $\alpha_1+\alpha_2$ seen in a plane spanned by the first and second semisubmersible columns 3a, 3b. According to one embodiment, the first and second longitudinal tower central axes 5a', 5b' are parallel to the first and second longitudinal column central axes 3a', 3b', respectively. According to one embodiment the first and second longitudinal tower central axis 5a', 5b' is aligned with the first and second longitudinal column central axis 3a', 3b', respectively. According to one embodiment the inclination of the first and second semisubmersible columns 3a, 3b and first and second towers 5a, 5b enables a more compact floating unit 2, while at the same time the distance between the wind turbines 4a, 4b can be kept at a sufficient or similar distance as without the inclination, thereby also enabling the use of sufficiently large or similarly sized turbine rotor blades for the energy production, as without the inclination. In this sense, the floating unit 2 aims to optimize the size/cost vs its ability of energy production. According to one embodiment the first and second angles $\alpha_1$, $\alpha_{12}$ are the same. According to one embodiment, the first and second angles are in the interval of $5°\leq(\alpha_1, \alpha_2)\leq25°$, more preferably $10°\leq(\alpha_1, \alpha_2)\leq20°$, most preferably $12°\leq(\alpha_1, \alpha_2)\leq17°$. According to one embodiment, the first and second angles $(\alpha_1, \alpha_2)$ are 15°. As a further effect of using first and second semisubmersible columns 3a, 3b that are arranged in the floating unit 2 with a first and second angle $\alpha_1$, $\alpha_2$ respectively, with respect to a reference direction z, a floating unit 2 with a higher water line area is provided which provides a higher hydrodynamic rigidity, i.e. a higher resistance in the water. The higher resistance in the water provides a resistance against unwanted movements of the floating unit 2 during use. As a result, the displacement of the floating unit 2, e.g. by the semisubmersible columns 3a, 3b, 3c and their respective end portions 30a, 30b, 30c, may be reduced. The reduction of the displacement enables the reduction of material and thus further lowers the cost of manufacturing the floating unit 2 and wind power platform 1.

Figure 3:
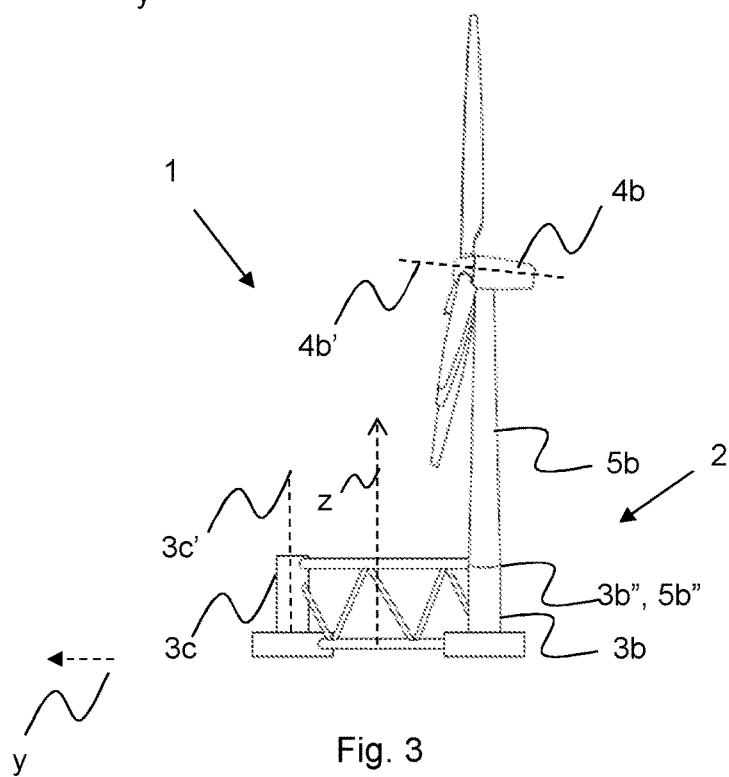
FIG. 3 shows a side view of the floating wind power platform according to FIGS. 1-2.

FIG. 3 shows a side view of the floating wind power platform 1 for offshore power production, as seen perpendicular to the rotational axis 4a', 4b' of the turbine rotors. As can be seen herein, according to one embodiment, the first and second semisubmersible columns 3a, 3b span a plane, wherein the plane has a normal direction in a horizontal direction y. According to one embodiment, the first and second semisubmersible columns 3a, 3b span a plane, wherein the plane has a normal direction y which is perpendicular to the reference direction z. According to one embodiment, the z and y directions are defined to form or correspond to the axes of a coordinate system as seen in FIG. 2, further comprising a further horizontal direction x. According to one embodiment, the longitudinal central axis 3c' of a third semisubmersible column 3c is parallel to the reference direction z. According to one embodiment, if the floating unit 2 is shaped as an oblique triangle, the plane spanned by the first and second semisubmersible columns 3a, 3b will not be in a direction parallel to the wind direction during weather vaning, during use when the platform 1 and floating unit 2 has reached a balanced state. Thus, in these cases the plane spanned by the first wind turbine rotor and the second wind turbine rotor will be different planes, and one of the first and second columns 3a, 3b will be an upwind column and the other will be a downwind column.

Figure 4:
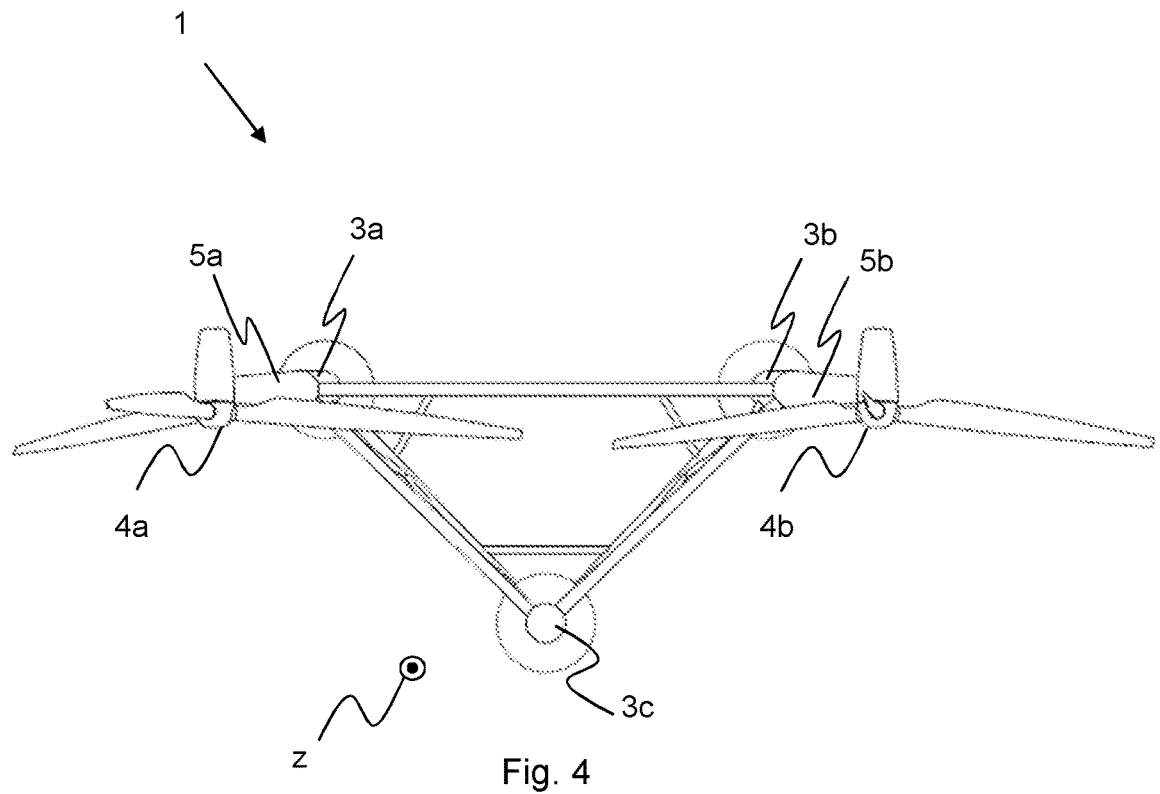
FIG. 4 shows a side view of the floating wind power platform according to FIGS. 1-3.

FIG. 4 shows a side view of the floating wind power platform 1 for offshore power production seen in a negative z-direction.

Figure 5:
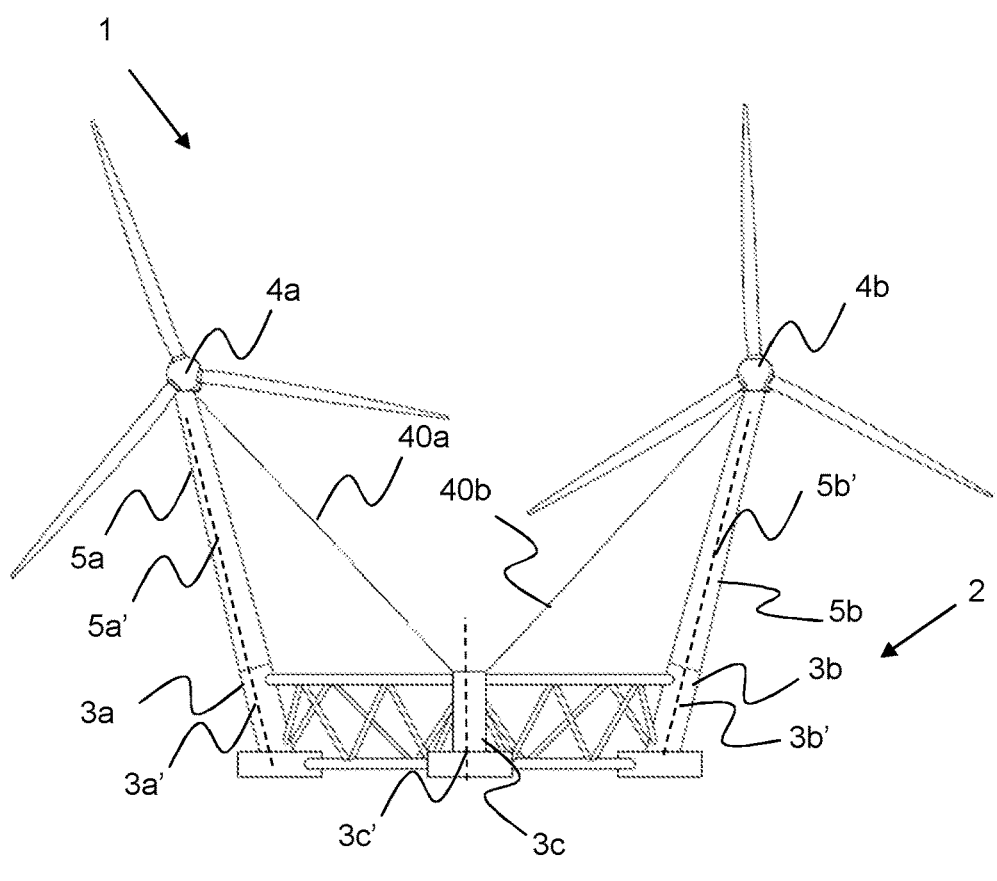
FIG. 5 shows a side view of the floating wind power platform according to FIGS. 1-4.

FIG. 5 shows a side view of the floating wind power platform 1 for offshore power production. As seen herein, according to one embodiment, first and second supporting members 40a, 40b are arranged to interconnect the first and second towers 5a, 5b with the floating unit 2 respectively. According to one embodiment, at least one supporting member 40a, 40b may be arranged between and interconnecting the two towers 5a, 5b. According to one embodiment, the use of supporting members 40a, 40b reduces the stress at the connection point of the towers 5a, 5b with the columns 3a, 3b, respectively, such as e.g. at the bolt connections at the abutment surfaces 3a", 5a", and 3b", 5b", due to gravitation. According to one embodiment, the use of supporting members 40a, 40b increases the stability of the wind power platform 1. According to one embodiment, the wind turbines 4a, 4b are configured to be rotatable in relation to the wind towers 5a, 5b, respectively wherein the axis of rotation is parallel to the longitudinal tower central axis 5a', 5b'. According to one embodiment, the wind turbines 4a, 4b are configured to be rotatable in relation to the wind towers 5a, 5b, respectively, wherein the axis of rotation is parallel to the reference direction z. According to one embodiment, the rotation, i.e. a relative angular displacement of the wind turbines with respect to the wind towers 5a, 5b, respectively are limited whereby engagement of the wind turbine rotor blades and the wind towers are avoided e.g. during use. According to one embodiment, the limitation is configured to be set by the mechanical construction, such as e.g. a mechanical stop. According to one embodiment, the limitation is configured to be set by a software. According to one embodiment, the wind power platform 1 is configured for energy production by the rotation of the wind turbine rotor blades, and generated in the wind turbines or nacelles by e.g. a generator. According to one embodiment, the offshore power/energy production may be transferred to or brought onshore via an energy cable configured for transferring energy.

A preferred embodiment of a floating wind power platform 1 for offshore power production has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. A floating wind power platform for offshore power production, comprising,
a floating unit, wherein the floating unit comprises a first, a second and a third interconnected semisubmersible column each having a longitudinal column central axis and each being arranged in a respective corner of the floating unit,
a first and second wind turbine, arranged to the first and second semisubmersible columns, respectively, via a first and second tower respectively, wherein the first and second towers have a first and second longitudinal tower central axis, respectively, wherein the first and second semisubmersible columns are arranged in the floating unit with a first and second angle ($\alpha_1$, $\alpha_2$) respectively, with respect to a reference direction (z), and directed away from each other, wherein the first and second longitudinal tower central axes are parallel to the first and second longitudinal column central axes, respectively.

2. The floating wind power platform according to claim 1, wherein the first and second angles ($a_1$, $a_2$) are the same.

3. The floating wind power platform according to claim 1, wherein the first and second angles are in the interval of $5° \leq (a_1, a_2) \leq 25°$.

4. The floating wind power platform according to claim 1, wherein the first and second angles ($a_1$, $a_2$) are 15°.

5. The floating wind power platform according to claim 1, wherein the floating unit is shaped as a triangle wherein the corners of the triangle form the corners of the floating unit.

6. The floating wind power platform according to claim 1, wherein the floating unit comprises a truss structure.

7. The floating wind power platform according to claim 1, wherein the semisubmersible columns are interconnected to each other via upper connection members and parallelly arranged corresponding lower connection members, wherein the lower connection members are shorter than the upper connection members.

8. The floating wind power platform according to claim 1, wherein the first and second towers are interconnected to the first and second semisubmersible column, respectively.

9. The floating wind power platform according to claim 1, wherein abutment surfaces, forming interfaces between the first and second towers and the first and second semisubmersible columns, respectively, have a normal direction parallel to the first and second longitudinal tower central axes and the first and second longitudinal column central axes, respectively.

10. The floating wind power platform according to claim 1, wherein the first and second towers are integral with and forms the first and second semisubmersible columns.

11. The floating wind power platform according to claim 1, wherein the diameter and cross-sectional area of the first and second towers and the first and second semisubmersible columns, respectively, are similar.

12. The floating wind power platform according to claim 1, wherein the first and second semisubmersible columns span a plane, wherein the plane has a normal direction in a horizontal direction.

13. The floating wind power platform according to claim 1, wherein the first and second longitudinal tower central axes are aligned with the first and second longitudinal column central axes, respectively.

14. The floating wind power platform according to claim 1, wherein first and second supporting members are arranged to interconnect the first and second towers with the floating unit respectively.

15. The floating wind power platform according to claim 1, wherein the floating wind power platform is further adapted to weather vane in relation to the wind direction.

16. The floating wind power platform according to claim 1, wherein the reference direction (z) is a vertical direction (z).

* * * * *